(12) United States Patent
Reimers et al.

(10) Patent No.: US 7,087,689 B1
(45) Date of Patent: Aug. 8, 2006

(54) METHOD FOR POLYMERIZING STYRENE

(75) Inventors: Jay Reimers, Houston, TX (US); Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/115,431

(22) Filed: Apr. 27, 2005

(51) Int. Cl.
*C08F 4/80* (2006.01)
*C08F 279/02* (2006.01)

(52) U.S. Cl. .................. 526/135; 526/208; 526/230; 526/232.1; 526/346; 526/915; 525/269; 525/316

(58) Field of Classification Search ........... 526/135, 526/146, 147, 192, 915, 219.2, 208, 230, 526/232.1, 346; 525/245, 264, 316, 260, 525/269
See application file for complete search history.

(56) References Cited

U.S. PATENT DOCUMENTS

| | | | | |
|---|---|---|---|---|
| 4,009,150 | A | * | 2/1977 | Norling .................. 526/141 |
| 4,124,782 | A | * | 11/1978 | Schon .................. 369/149 |
| 4,567,232 | A | | 1/1986 | Echte et al. ................ 525/53 |
| 4,777,210 | A | | 10/1988 | Sosa et al. ................ 525/53 |
| 5,569,709 | A | * | 10/1996 | Sue et al. ................ 525/52 |
| 6,399,721 | B1 | * | 6/2002 | Schulz et al. .............. 526/93 |

OTHER PUBLICATIONS

English language translation of Tinyakova et al., "The Redox Systems For Initiation Of Free Radical Processes . . . ", Izvestiya Akademii Nauk SSSR, Otdelenie khimicheskikh nauk, No. 6 (1957), pp. 702-710 (corresponding to pp. 3-26 of translation).*

Fusco et al., Butyl and Halobutyl Rubbers, Rubber Technology (3rd ed.), Van Nostrand Reinhold, N.Y., (1987) pp. 284, 285 and 297.*

Gregory G. Hlatky; *Heterogeneous Single-site Catalysts for Olefin Polymerization*, Chem. Rev. 2000, vol. 100, No. 4, pp. 1347-1376, 9 Tables.

Eugene You-Xian Chen et al.; *Cocatalysts for Metal-Catalyzed Olefin Polymerization: Activators, Activation Processes, and Structure-Activity Relationships*, Chem. Rev. vol. 100, No. 4, pp. 1391-1434, 27 Figs.

Foster Dee Snell et al.; *Encyclopedia of Industiral Chemical Analysis*, vol. 18, (1973), Interscience Publishers, New York, p. 329.

* cited by examiner

*Primary Examiner*—Fred Teskin
(74) *Attorney, Agent, or Firm*—Madan, Mossman & Sriram PC; Tenley R. Krueger

(57) ABSTRACT

A method of homogeneously polymerizing styrene comprising admixing an ethylenically unsaturated monomer and an initiation system that is soluble in the monomer. This system includes a metal; a peroxide, hydroperoxide or mixture thereof; and a reductant. Under appropriate reaction conditions, the cyclic oxidation and reduction of the metal produces free radicals which initiate homogeneous polymerization of the ethylenically unsaturated monomer. The invention beneficially enables relatively low temperature processing with inexpensive initiation.

3 Claims, 1 Drawing Sheet

Schematic of Redox Initiation with Hydroperoxide as Oxidant and Hydroxy Ketone as Reductant

METHOD FOR POLYMERIZING STYRENE

BACKGROUND OF THE INVENTION

1. Field of the Invention

The invention relates to methods of polymerizing styrene. More particularly, it relates to methods of homogeneous polymerization of styrene based on an interactive initiation system.

2. Background

Since the discovery that rubber-like polymers of improved quality may be produced by polymerizations conducted at relatively low temperatures, numerous polymerization formulations and procedures have been developed to take advantage of this resulting quality improvement. Monomers benefiting from these polymerizations include, in particular, those that are ethylenically unsaturated, such as conjugated butadienes; haloprenes; alkenyl aromatic hydrocarbons such as styrene; acrylic and acrylic esters and their nitrites and amides; vinyl acetate; and the like. These monomers may be polymerized to form materials that are highly sought for a variety of uses, including durable goods, such as furniture, toys, housings, storage containers, and many others.

Unfortunately, reducing the temperature of polymerization in order to improve polymer quality may also result in undesired effects, such as reduced reproducibility, slower rate of reaction and increased induction time. To offset one or more of these disadvantages, a number of methods have been developed that frequently use relatively expensive initiators.

These procedures may be separated into two general categories: heterogeneous polymerizations, in which the initiator exists in a different phase from that of the reactants; and homogeneous, or "bulk", polymerizations, in which the initiator exists in the same phase as that of the reactants. Heterogeneous polymerizations include emulsion polymerizations. Many emulsion polymerization systems employ redox initiators that are soluble in water, but not soluble in the monomer or monomer mix. These initiators may enable the polymerization to be carried out at relatively low temperatures, e.g., in some cases at or below room temperature. However, the water-soluble redox initiators tend to be expensive and the reaction rate and/or efficiency tends to be impractical from a commercial standpoint.

Thus, what is needed in the art is a method of homogeneously polymerizing unsaturated organic compounds that produces polymers of improved quality. Desirably, such a method would operate effectively at relatively low temperatures, but could employ relatively inexpensive initiators. It is also desirable that the method reduces or eliminates the occurrence of temperature-related problems, such as reduced reaction rates.

SUMMARY OF THE INVENTION

The invention provides a method of homogeneously polymerizing styrene which offers the benefits of enabling relatively low temperature processing with potentially inexpensive initiation. The method comprises admixing at least one ethylenically unsaturated monomer and a redox initiation system that is substantially soluble in the monomer. This system includes a metal; peroxide, hydroperoxide or mixture thereof; and a reductant. Under appropriate reaction conditions, the cyclic oxidation and reduction of the metal produces free radicals which initiate polymerization of the ethylenically unsaturated monomer. The metal is combined as a salt or complexed with a complexing agent such that it is substantially soluble in the monomer.

BRIEF DESCRIPTION OF THE DRAWINGS

For a detailed understanding and better appreciation of the invention, reference should be made to the following detailed description of the invention taken in conjunction with the accompanying drawings, wherein.

DETAILED DESCRIPTION OF THE EMBODIMENTS

Figure 1:
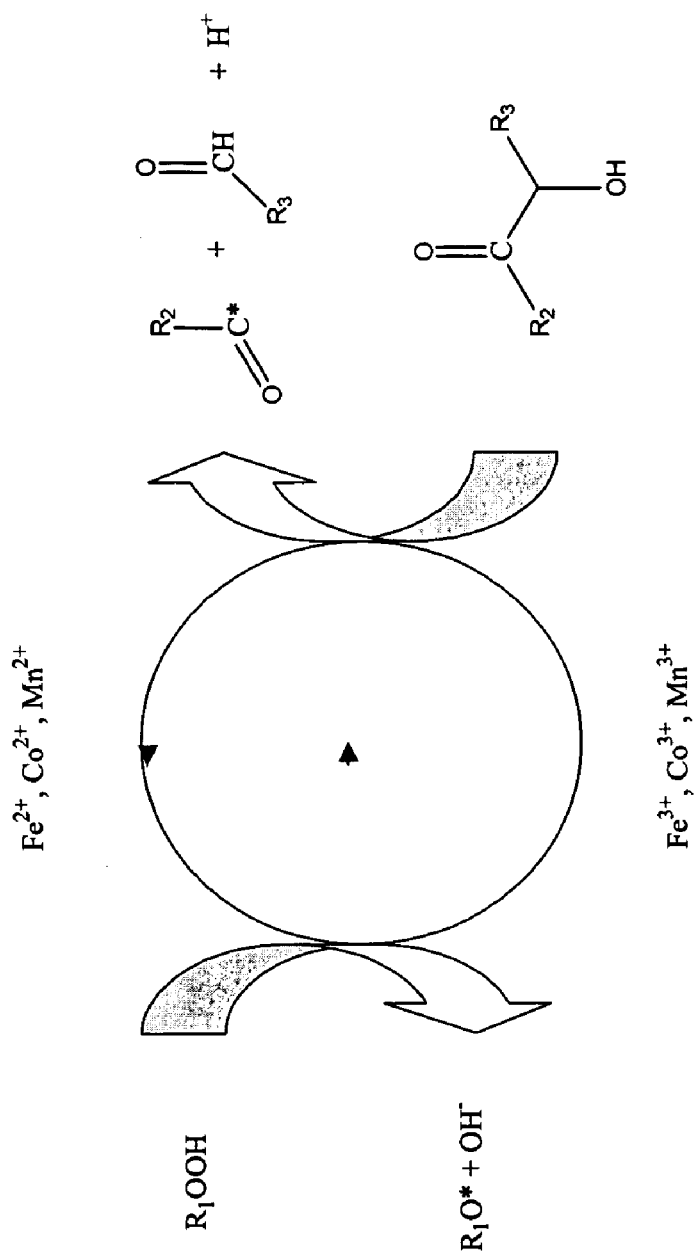
FIG. 1 is an illustration of a cyclic process capable of changing an oxidant to a reductant and vice versa.

The polymerization reactions of the invention may be conducted under ambient or superatmospheric pressures. Such as those that are conducted in a neutral atmosphere such as a nitrogen atmosphere, which may be easily accomplished using conventional polymer processing equipment incorporating gas purge capability. The reactions may be conducted at temperatures ranging from relatively low temperatures, which are slightly above the freezing point of the monomers or polymers, to relatively high temperatures which are slightly below the decomposition temperature of the monomers or polymers and/or temperatures at which the rate of decomposition of the initiator system components, as described below, becomes unacceptably rapid. In general, temperatures ranging from about −10 to about 130° C. may be very effectively used.

In one embodiment, the invention involves a homogeneous, or bulk, polymerization. Thus, it does not involve use of a reaction medium, such as an organic liquid or water, in which the monomers and initiation system are suspended, dispersed, dissolved, or emulsified. Rather, only the monomers and initiation system components are contacted in a neat reaction to produce the final polymer. In other embodiments, where the reactants have a high viscosity, such as in the production of polystyrene or rubber, a diluent such as ethylbenzene, cyclohexane, xylenes or toluene is used.

A feature of the invention is use of a novel initiation system which comprises components which are substantially soluble in the monomers being polymerized. As used herein, the term "monomers" refers to either traditional monomers, or to pre-prepared polymers which are being copolymerized. The phrase "substantially soluble" means that the solubility is sufficiently high such that it is either complete or such that the presence of any insoluble portion does not significantly and negatively affect either the polymerization reaction or the polymer product. This initiation system is a so-called "redox" system, and includes an oxidant, a reductant, as well as a metal.

The oxidant may be selected from a wide variety of known peroxides and hydroperoxides, and mixtures thereof. For purposes of this application a peroxide is defined as a molecule having the structure ROOR', while a hydroperoxide has a structure ROOH. As used herein, R is defined as any functional group providing alkyl or acyl character to the molecule, and R' is also an alkyl or acyl functional group which may be the same as or different from R. Thus, the oxidant may be an azo initiator, an alkyl peroxide or acyl peroxide, an alkyl or acyl hydroperoxide, or a mixture thereof. Examples of these include, but are not limited to benzoyl peroxide, cumene hydroperoxide, t-butyl hydroperoxide, azobisisobutyronitrile, mixtures thereof, and the like. Of these, benzoyl peroxide and cumene hydroperoxide are among the more economical. It is an advantage of the invention that relatively large and expensive peroxides and hydroperoxides are unnecessary.

The second component of the initiation system is the reductant. This component may be selected from known reductants such as alpha-hydroxy ketones, substituted ascorbic acids, sulfinic acids, hydroxyacetone, 2-hydroxy-2-phenylacetophenone, ascorbic palmitate, toluene sulfinic acid, mixtures thereof, and the like. Of these, hydroxyacetone, 2-hydroxy-2-phenylacetophenone, ascorbic palmitate, and toluene sulfinic acid are among the more economical. Thiodiethanol, triethanolamine, benzoin, ascorbic acid esters, glyoxal trimer, and toluene sulfinic may be used in practicing the invention.

The final component of the initiation system is the metal. In many cases metal salts may be used, where such are soluble in the monomer. Exemplary are salts of transition elements, including those of Groups VIb, VIIb, VIII, Ib and IIb of the Periodic Table of the Elements. Others salts, and mixtures of salts, of iron, cobalt or manganese may be used. Other useful salts include, but are not limited to, salts of nickel, chromium, copper and zinc. However, it is also possible in some instances to choose metal-containing molecules that are not salts, where other complexing agents are employed to ensure solubility in the monomer. Examples include fatty acids, such as oleic, palmitic, and linoleic acid; other organic acids such as citric and oxalic acid; ethylenediaminetetraacetic acid (EDTA); and ethanol amines. The quantity of the metal component in the monomer is capable of being described as "trace", in the range of from about 1 ppm of monomer to about 50 ppm, desirably from about 1 ppm to about 10 ppm, based on 1,000 g of monomer or monomer mixture.

The proportion of total initiation system to monomer will be easily determined by those skilled in the art. In general, the initiation system of the invention is present in an extremely small amount, for example, with the initiation system representing from about 50 to 300 ppm based on a monomer mix of 1000 g, more from about 100 to about 200 ppm. Greater amounts may be used, but such are normally unnecessary to accomplish polymerization within a commercially acceptable time period. In the invention the initiation system predominantly comprises an approximately stoichiometric ratio of oxidant to reductant, with just a trace of the metal-containing material.

The invention provides a particularly effective initiation of polymerization due to the increased production of free radicals. This production is increased because the metal's oxidation state changes according to whether it is being oxidized or reduced and two radicals are released with each sequential oxidation-reduction cycle. This changing an oxidant to a reductant and vice versa at equilibrium continues until the exhaustion of the monomer, the oxidant and/or the reductant. An illustration of this is found in FIG. 1. A particular advantage of the invention is that it is possible to use either the oxidant or the reductant in excess, which serves to shift the reaction's equilibrium to favor a particular oxidation state at the end of the polymerization. This could be desirable in cases where leaving the metal in the polymer in a particular oxidation state is more or less desirable. For example, since Fe (III) is often colored, and Fe (II) is not colored, it is generally more desirable to ensure that the final oxidation state is Fe (II), where a polymer having a color that is white or near-white is desired. Regardless of the oxidation state of the starting metal, it should be remembered that both the oxidant and reductant, while technically reactive with one another, are far more reactive with the metal.

The method of the invention may be carried out in either a continuous or batch mode. It is therefore possible to combine all components at one time, or to add them in any sequence. It is also possible to first add one or two components of the initiation system to the monomer mixture in batch mode, then subsequently add the remaining component(s) in continuous mode.

While the invention may be used to prepare homopolysytrene, it may desirably be used to prepare high impact polystyrene (HIPS). The process for making HIPS material consists of polymerizing styrene monomer in the presence of dissolved rubber. Polystyrene is initially formed from the styrene monomer within the homogeneous rubber solution. The usual rubber types utilized in the manufacture of HIPS include polybutadiene (PB), styrene-butadiene rubber (SBR), and styrene-butadiene-styrene rubber (SBS). Current processes for making HIPS materials most generally utilize two continuous-stirred tank reactors (CSTR) in the initial manufacturing process to control grafting of the elastomer and styrene particles as well as controlling the rubber particle size (RPS) character of the material. One example of the prior art disclosing such a process is the patent to issued to Echte, U.S. Pat. No. 4,567,232, the contents of which are incorporated herein by reference. Another exemplary reference is U.S. Pat. No. 4,777,210, to Sosa, et al., which reference is also incorporated herein by reference.

The cost of the chemicals used for the invention are quite low, affording a significant economic advantage when used in a production facility. Also, in the production of HIPS, certain physical properties, such as the swell index at certain Gel/rubber ratios may be advantageously high.

The temperatures at which the invention may be practiced may be quite low. This offers an operational advantage, as opposed to conventional processes, in the form of additional time for the rubber and polystyrene to graft in HIPS applications. Also, the high initial flux of radicals that may be observed with the invention may serve to avoid premature phase changes in the reactors wherein the unincorporated rubber is incompatible with polystyrene. In HIPS, greater levels of grafting of the rubber and polystyrene may allow for the use of less rubber which, in one embodiment, may also be an economic advantage of the invention.

The polystyrene and HIPS prepared using the invention can be used in a broad area of applications including, but not limited to: food packaging; lighting, construction, decoration; computer reels; packaging containers; disposable dinnerware; hangers; medical ware; toys; packaging, thin-walled containers; non-food packaging; gloss laminations; tumblers; medical ware; toys; rigid packaging; and bottles.

The following examples are provided to help illustrate some embodiments of the invention. These examples should not, however, be construed as limitative of the scope of the invention in any way.

EXAMPLES 1–8

Seven weight percent polybutylene rubber is dissolved in styrene monomer. This solution is fed into a lab scale dual CSTR reactor apparatus with the catalysts systems as shown in Table 1. The source of the components are as follows: cumene hydroperoxide (GEO Chemicals), thiodiethanol (Atofina Chemicals), triethanolamine (BASF), benzoin (Eastman), ascorbic acid, palmitate ester (Bayer), glyoxal trimer (BASF), and toluenesulfinic acid, (Pechiney Chemicals). Iron (III)ethylhexanoate 50% in mineral oil is used as the metal.

TABLE 1

Formulations

| Formulations | 1 | 2 | 3 | 4 | 5 | 6 | 7* | 8 |
|---|---|---|---|---|---|---|---|---|
| Oxidant (ppm) | | | | | | | | |
| Cumene Hydroperoxide | 500 | 500 | 500 | 500 | 500 | 500 | 500 | 500 |
| Reductant (ppm) | | | | | | | | |
| Thiodiethanol | 500 | | | | | | | |
| Triethanolamine | | 500 | | | | | 500 | 500 |
| Benzoin | | | 500 | | | | | |
| Ascorbic Acid, Ester | | | | 500 | | | | |
| Glyoxal Trimer | | | | | 500 | | | |
| Toluene Sulfinic Acid | | | | | | 500 | | |
| Metal (ppm) | | | | | | | | |
| Fe(EHA)$_3$ | 2.5 | 2.5 | 2.5 | 2.5 | 2.5 | 2.5 | 0 | 5 |

*Example 7 is a comparative example and not an example of the invention.

The reactants are heated at 90° C. for two hours, 130° C. for one hour, and a final hour at 150° C. The reductants and oxidant are kept separate and introduced separately to the reactor. Since the iron is in the oxidize state it is added to the oxidant just prior to its introduction to the reactor. Reactor samples are withdrawn every hour for solids measurement, and final reactor contents are devolatized and submitted for color, rubber particle size measurement, and physical properties. Color is determined using the Yellow Index test as set forth in ASTM D-1000-3; Rubber Particle Size is determined using ASTM F577-78 Malvern Particle Size Analyzer;

Swell index and gel content are determined using the procedure outlined in the "Encyclopedia of Industrial Chemical Analysis", F. D. Snell and L. S. Ettre, Eds., Vol. 18, p. 329 (1973), Interscience Publishers, New York: The gel content, which expresses the degree of grafting, i.e. the quantity of polystyrene grafted on to the rubber, is determined by shaking 1 g of the HIPS in 20 ml of toluene at room temperature, and then centrifuging the whole to separate toluene-insoluble gel from the remainder. The percentage of gel, related to the sample taken, expresses the gel content; and the swelling index, which enables the degree of crosslinking to be expressed, is equal to the ratio of the mass of gel to the dry resin.

TABLE 2

Color Measurements of Devolatized Samples

| Formulations | 1 | 2 | 3 | 4 | 5 | 6 | 7 | 8 |
|---|---|---|---|---|---|---|---|---|
| Color | | | | | | | | |
| L | 77 | 82 | 77 | 79 | 68 | 71 | 79 | 76 |
| a | −1.69 | −1.91 | −1.86 | −1.38 | −0.32 | −1.04 | −1.9 | −1.65 |
| b | −4.9 | −1.9 | −0.63 | 5.58 | −0.38 | −1.53 | −3.83 | −4.04 |
| YI | −12.92 | −5.79 | −3.19 | 11.42 | −1.32 | −4.89 | −10.33 | −11.11 |

TABLE 3

Properties of the Rubber Phase

| Formulations | 1 | 2 | 3 | 4 | 5 | 6 | 7 | 8 |
|---|---|---|---|---|---|---|---|---|
| Rubber Chemistries | | | | | | | | |
| Swell Index, % | 10.25 | 11.61 | 11.76 | 11.45 | 14.43 | 18.42 | 13.78 | 13.51 |
| Gel/Rubber | 3.34 | 3.46 | 3.65 | 3.36 | 2.89 | 2.81 | 2.77 | 2.81 |
| Grafting, % | 234 | 246 | 265 | 236 | 189 | 180 | 177 | 180 |

Rubber particle size measurements are also obtained from the samples and appear in Table 4. The narrow particle size distributions are most notable. There are no very small particles or very large particles observed in the polymerized samples.

TABLE 4

Rubber Particle Size

| Formulations | 1 | 2 | 3 | 4 | 5 | 6 | 7 | 8 |
|---|---|---|---|---|---|---|---|---|
| Rubber Particle Size | | | | | | | | |
| D[v, 0.5], microns | 3.41 | 3.75 | 5.17 | 3.08 | 3.76 | 3.52 | 3.37 | 3.44 |
| Span, microns | 1.63 | 1.45 | 1.54 | 1.36 | 1.34 | 1.48 | 1.57 | 1.62 |
| PDI | 1.1084 | 1.0722 | 1.0434 | 1.0931 | 1.0616 | 1.0848 | 1.1032 | 1.1053 |

The novel redox initiators are efficient, low cost alternatives to the conventional initiator systems. These systems may decomposed quickly at elevated temperatures to yield a high radical flux, thereby increasing the probability of grafting prior to inversion. They may also be used at lower temperatures to also promote grafting of rubber and styrene.

The invention claimed is:
1. A method of polymerizing styrene comprising admixing styrene monomer with an initiation system which is substantially soluble therein; said initiation system including cobalt naphthenate, cumene hydroperoxide, and 2-hydroxy-2-phenylacetophenone; under reaction conditions such that the cyclic oxidation and reduction of the metal produces free radicals which initiate homogeneous polymerization of the styrene monomer.

2. The method of claim 1 wherein the cobalt naphthenate is present in an amount of from about 2 ppm to about 20 ppm; the cumene hydroperoxide is present in an amount of from about 100 ppm to about 600 ppm; and the 2-hydroxy-2-phenylacetophenone is present in an amount of from about 100 ppm to about 600 ppm; based on about 2,000 g of styrene monomer.

3. A method of polymerizing styrene comprising admixing butadiene monomer with a initiation system which is substantially soluble therein; said initiation system including iron sulfate, benzoyl peroxide, and alpha-hydroxyketone; under reaction conditions such that the cyclic oxidation and reduction of the metal produces free radicals which initiate homogeneous polymerization of the butadiene monomer in the presence of styrene monomer.

* * * * *